Aug. 16, 1932.  M. F. THAU  1,872,050
ROASTER
Filed May 12, 1930
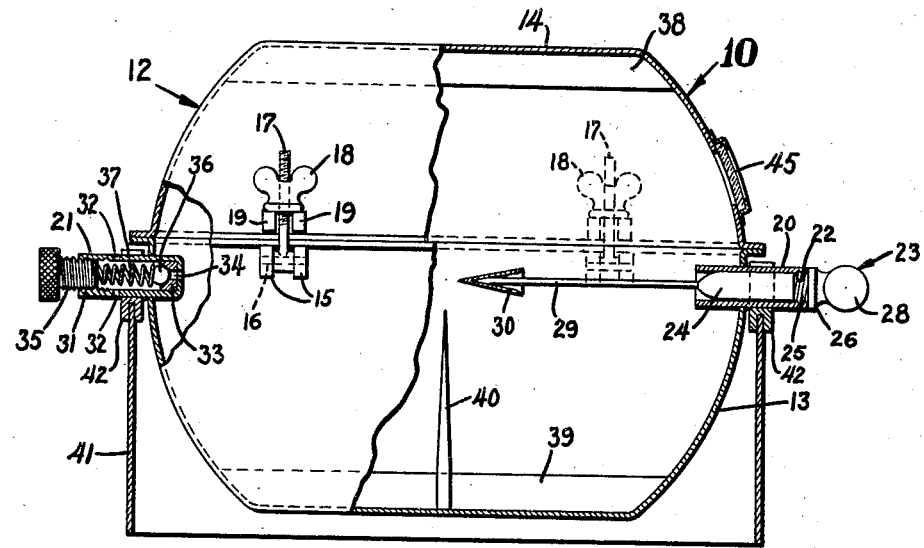
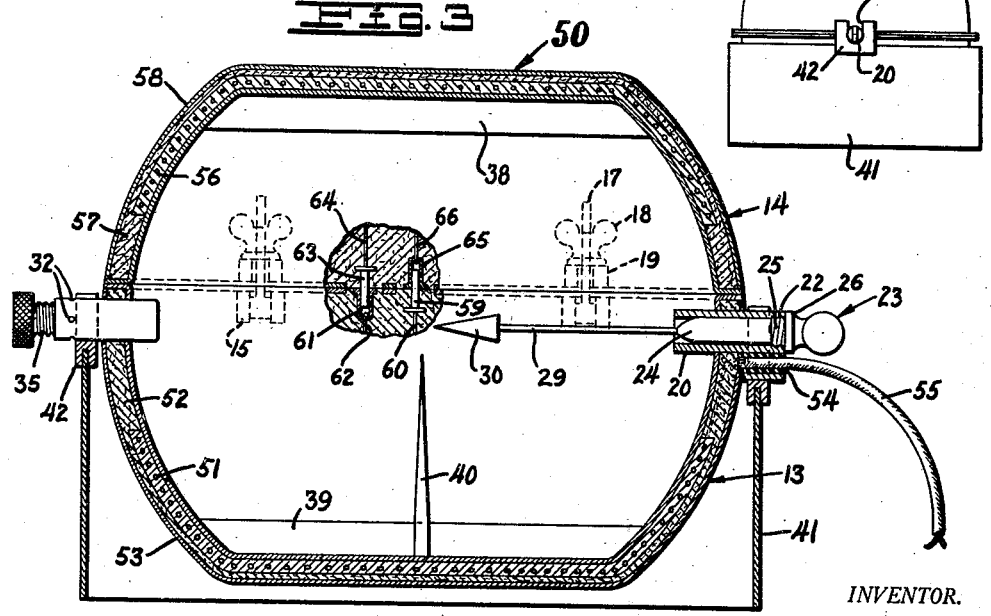
INVENTOR.
M. F. THAU.
BY
ATTORNEY.

Patented Aug. 16, 1932

1,872,050

UNITED STATES PATENT OFFICE

MAX F. THAU, OF LOS ANGELES, CALIFORNIA

ROASTER

Application filed May 12, 1930. Serial No. 451,650.

This invention relates to improvements in roasters.

The general object of the invention is to provide an improved self-basting roaster.

Another object of the invention is to provide a pressure cooking roaster.

A further object of the invention is to provide a roaster having a lid and including means whereby the contents of the roaster may be sampled without removing the lid.

A still further object of the invention is to provide a roaster of the class described including means for electrically heating the same.

Other objects and the advantages of this invention will be apparent from the following description taken in connection with the accompanying drawing wherein:

Fig. 1 is a side view of my improved roaster with parts broken away to more clearly illustrate the same.

Fig. 2 is an end view of the roaster on a reduced scale, and

Fig. 3 is a longitudinal section through a slight modification of my device.

Referring to the drawing by reference characters I have indicated my improved roaster generally at 10.

As shown this roaster comprises a container 12 which includes a bottom member 13 and a top member or lid 14. Secured to the bottom I provide a plurality of pairs of spaced bearings 15 between each pair of which I pivotally mount as at 16 a threaded stem 17 having a wing nut 18 thereon.

The lid 14 is provided with pairs of spaced lugs 19. To secure the lid 14 to the bottom member 13 the stems 17 are positioned between the lugs 19 of the lid and the wing nuts 18 are moved into engagement with the lugs 19 and tightened.

Secured to the bottom 13 as by welding I provide opposed trunnions 20 and 21, each of which extend into the interior of the bottom 13. The trunnion 20 is hollow and is provided with internal threads as at 22. Adapted to be positioned in the trunnion 20 I provide a tester 23 which includes a hub 24 having a threaded portion 25 adjacent one end which is adapted to engage the threaded portion 22 of the trunnion. On the outer end of the hub 24 I provide an enlarged head 26 which includes a thumb wing 28. Extending from the opposite end of the hub I provide a reduced shank 29 having a hollow cone 30 secured to the end thereof.

The trunnion 21 is also hollow with a closed inner end and an open outer end adjacent which I provide an internally threaded portion 31. In the sides of the trunnion 21 I provide a plurality of apertures 32 and adjacent the closed end of the trunnion I provide a ball valve seat 33 which includes an aperture 34 opening into the interior of the container.

For closing the open end of the trunnion 21 I provide an externally threaded plug 35, the threads of which are adapted to engage the threaded portion 31 of the trunnion. Within the trunnion 21 I provide a ball valve 36 which is adapted to be normally urged into engagement with the valve seat 33 by a coiled spring 37, one end of which engages the ball and the opposite end the inner end of the plug 35.

Extending transversely of the lid 14 I provide a rib or a plurality of ribs 38, and in the bottom member 13 I provide a similar rib or ribs 39. Secured to the bottom rib 39 I provide a spike 40.

For supporting the container 12 over a fire I provide a stand 41 which includes exposed bearings 42 each of which is provided with an open ended slot 43. The container 12 is adapted to be positioned in the stand 41 with the trunnions 20 and 21 positioned in the slots 43 of the bearings 42.

The lid 14 is preferably provided with a pyrex window 45 through which the contents of the container may be viewed.

When it is desired to cook a roast in the roaster 10 the lid 14 is removed and the tester 23 is withdrawn from the trunnion 20. The meat is then placed in the bottom 13 and rests on the rib or ribs 39 with the spike projecting into the meat. The tester 23 is then replaced in the trunnions 20 with the hollow cone 30 projecting into the meat. The lid 14 is then placed on the bottom member and secured thereto by the stems 17, and the nuts 18 as previously described, after which the container 14 is operatively positioned on the stand 41 and the entire device set over a fire.

During the cooking of the meat the container 12 is rotated on the trunnions periodically and as it is so rotated the juices from the meat which have collected in the bottom of the container will be carried upward and discharged over the meat, thus it will be seen that each time the container is rotated the meat therein will be automatically basted.

When the lid 14 is tightly clamped to the bottom member 13 the steam from the meat juices therein cannot escape except by unseating the ball 36 in the trunnion 21. It will thus be seen that the contents of the container is also pressure cooked. The pressure desired in the container may be regulated by adjusting the threaded plug 35, which will increase or decrease the tension of the spring 37 depending in which direction the plug moves.

When it is desired to test the roast the operator unscrews the tester 23 and pulls it outward. The operator can tell by the pull on the tester the state of the roast and should it not be near enough done the operator would not pull the tester all the way out. When the operator judges the roast to be nearly done he may pull the tester all the way out. When this is done the hollow of the cone 30 will be filled with meat and the operator may taste it to determine the condition of the meat.

In Fig. 3 I have indicated generally at 50 a slightly modified form of my improved roaster. This roaster is similar in almost all respects to the roaster 10 and the component parts are similarly numbered.

On the exterior of the bottom member 13 I provide an electrical heating element 51 which is covered with an asbestos composition 52 which in turn is covered with a metal sheathing 53. Electricity may be conducted to the heating element in any desired manner but I have shown the trunnion 20 as provided with an insulated conduit 54 through which an electric cable 55 extends and the wires of which are connected to the wires of the heating element.

On the exterior of the lid 14 I provide an electrical heating element 56 which is covered with an asbestos composition 57 and which is in turn covered with a metal sheathing 58.

In the asbestos covering of the bottom 13 I provide a metal plug 59 which is connected by a wire 60 to one end of the heating element 51 and a metal socket 61 which is connected by a wire 62 to the other end of the heating element 51.

In the asbestos covering of the lid 14 I provide a metal plug 63 connected to one end of the heating element 56 by a wire 64 and a metal socket 65 connected to the other end of the heating element 56 by a wire 65.

When the lid 14 of the device 50 is operatively positioned on the bottom 13 the plug 59 of the bottom 13 is positioned in the socket 65 of the lid and the plug 63 of the lid is positioned in the socket 61 of the bottom thereby electrically connecting the bottom heating element 51 and the lid heating element 56.

The cooking operation of the device 50 is similar to that previously described in connection with the device 10 except that it is not necessary to place the device 50 over a flame as the heating elements 51 and 56 furnish the heat for cooking.

From the foregoing description it will be apparent that I have provided a novel roaster which is simple in construction and efficient in use.

Having thus described my invention, I claim:

1. In a cooking device, a container, said container including a bottom member and a top member, releasable means to secure said top member to said bottom member, a support for said container, bearing members on opposite sides of said support, a pair of trunnions on said bottom member, said trunnions being positioned in said bearing members and being readily removable therefrom, one of said trunnions being hollow and having a threaded portion adjacent the outer end thereof, a tester, said tester including a hub having a threaded portion engaging said threaded portion of said trunnion, a handle on said hub, a reduced shank extending from the inner end of said hub and a hollow cone secured to said shank.

2. In a cooking device, a container, said container including a bottom member and a top member, releasable means to secure said top member to said bottom member, a support for said container, bearing members on opposite sides of said support, a pair of trunnions on said bottom member, said trunnions being positioned in said bearing members and being readily removable therefrom, one of said trunnions being hollow and having a threaded portion adjacent the outer end thereof, a valve seat in said trunnions, said seat communicating with the interior of said container, a closure plug, said plug including a threaded shank engaging said threaded portion of said trunnion, a ball valve engaging said valve seat and a coiled spring engaging said ball and bearing against the inner end of the plug, there being a plurality of apertures in said trunnions exterior of said container.

3. In a cooking device, a container including a bottom member and a top member, releasable means to secure said top member to said bottom member, a support for said container, bearing members on opposite sides of said support, a pair of trunnions on said bottom member, said trunnions being positioned in said bearing members and being readily removable therefrom, a conduit opening into said container and having a threaded portion adjacent the outer end thereof, a tester, said tester including a hub having a threaded portion adapted to engage said threaded portion of said conduit, a handle on said hub, a reduced shank extending from the inner end of said hub, a hollow cone secured to said shank, a second conduit communicating with said container and having a valve seat adjacent the inner end thereof, an aperture in said valve seat opening into said container, a threaded portion adjacent the outer end of said conduit, a closure plug, said plug including a threaded shank adapted to engage said threaded portion of said conduit, a ball valve adapted to engage said valve seat, a coiled spring engaging said ball and bearing against the inner end of the plug and a plurality of apertures in said conduit.

4. In a cooking device, a container including a bottom member and a top member, releasable means to secure said top member to said bottom member, a transversely extending rib adjacent the interior of the bottom of said bottom member and a similar rib on said top member, a spike secured to said bottom member rib, a support for said container, bearing members on opposite sides of said support, a pair of trunnions on said bottom member, said trunnions being positioned in said bearing members and being readily removable therefrom, one of said trunnions being hollow and having a threaded portion adjacent the outer end thereof, a tester including a hub having a threaded portion adapted to engage said threaded portion of said trunnion, a handle on said hub, a reduced shank extending from the inner end of said hub, a hollow cone secured to said shank, the other of said trunnions being hollow and having a valve seat adjacent the inner end thereof, an aperture in said valve seat opening into said container, a threaded portion adjacent the outer end thereof, a closure plug, said plug including a threaded shank adapted to engage said threaded portion of said trunnion, a ball valve adapted to engage said valve seat, a coiled spring engaging said ball and bearing against the inner end of said plug and a plurality of apertures in said trunnion, a heating element adjacent the exterior of said bottom member, a second heating element adjacent the exterior of said top member, means to electrically connect said first and second heating elements when said top and bottom members are operatively placed together, a heat insulating covering over each of said heating elements and a casing over each of said coverings.

5. In a cooking device, a container, said container including a bottom member and a top member, releasable means to secure said top member to said bottom member, a support for said container, bearing members on opposite sides of said support, a pair of trunnions on said container, said trunnions being positioned in said bearing members and being rotatable therein to rotate the container, said trunnions being readily removable from said bearing members, a rib extending across the bottom of said bottom member, a second rib extending across the top of said member, said ribs extending lengthwise of the axis of said trunnions, said ribs forming spaced receptacles in said top member and in said bottom member, said receptacle being adapted to receive meat juices whereby when the container is inverted the juice will be distributed over the meat in said container.

In testimony whereof, I hereunto affix my signature.

MAX F. THAU.